United States Patent Office 3,278,511
Patented Oct. 11, 1966

3,278,511
POLYMERIZATION OF UNSATURATED
HYDROCARBONS
Arthur W. Langer, Jr., Watchung, N.J., assignor to Esso Research and Engineering Company, a corporation of Delaware
No Drawing. Filed Mar. 28, 1963, Ser. No. 268,546
9 Claims. (Cl. 260—93.7)

The present invention concerns the polymerization of ethylenic unsaturated hydrocarbons in the presence of a catalyst modified with a cyclic hydrocarbon compound. More particularly, the invention relates to combinations of alkyl metal compounds and cyclic hydrocarbons containing at least 6 carbon atoms and their utilization in the manufacture of polyolefins.

Heretofore a substantial amount of research has been directed toward the development of so-called "Ziegler-type catalysts" having an improved stereospecificity, particularly in the synthesis of homopolymers of $C_3$ and higher alpha olefins. It has been found that certain compounds containing electron donor elements, such as nitrogen, phosphorus, oxygen and sulfur, are useful in this respect. However, many of the compounds used to improve stereospecificity have other undesirable effects on the polymerization process and on the recovery of the polymer product. For instance, some of the catalyst modifiers contain amines which contaminate the diluent and other liquids used in the polymerization reaction and present serious odor problems. In many cases they make the removal of catalyst residues from the polymer much more difficult.

It has now been found that certain unsaturated cyclic hydrocarbon compounds, especially those containing at least one aromatic ring, coact with the alkyl metal component of the Ziegler-type catalyst system and thereby increase the isotacticity of the resulting polymer. It is not known whether or not the combination of alkyl metal compound and the cyclic hydrocarbon is a complex, but there are strong indications that this is the case. Therefore, for simplification and ease of understanding, the combination of the alkyl metal compound and the cyclic hydrocarbon compound will be hereinafter referred to as a complex.

The "complex" is preferably prepared by premixing each mole of the alkyl metal compound, for example, triethyl aluminum, with from 0.5 to 10 moles of a cyclic hydrocarbon. In the case of polycyclic hydrocarbons that form relatively strong complexes, such as indene, the molar ratio of hydrocarbon compound to alkyl metal compound should be between about 0.5 and 2:1, and preferably about 1:1. The mixture is then contacted with the reducible metal catalyst component in a molar ratio of alkyl metal to said component of 0.5 to 10:1. Care should be taken to use at least 0.5 mole, e.g. 1 to 4 moles, of cyclic hydrocarbon per mole of the reducible metal catalyst component in order to obtain the desired results.

If the cyclic hydrocarbon is solid at room temperature or the alkyl metal is highly pyrophoric, it is advisable to admix the two components in the presence of a suitable solvent, preferably a paraffinic or simple aromatic hydrocarbon, such as normal heptane and para-xylene. The amount of solvent is not important, particularly where the same material is used as a diluent in the subsequent polymerization reaction. The two components of the complex can be mixed at substantially any suitable temperature. For most purposes, it is advisable to utilize temperatures between 0° and about 100° C.; and, for economic reasons, it is preferred to use room temperature or moderately elevated temperatures, such as up to about 50° C. If the polymerization reaction is effected at a relatively high temperature, the catalyst containing the complex can be prepared at approximately that temperature so that the catalyst will not cool the polymerization reaction mixture. If convenient, it is usually best to employ about 1 to 100 or more parts by weight of solvent per part by weight of complex in order to facilitate mixing and allow the complex to reach equilibrium as soon as possible, although the pure components may be mixed if this does not lead to undesirable side reactions.

It is believed that the complex is an equimolar combination of the alkyl metal compound and the cyclic hydrocarbon; and, therefore, it should only be necessary to use a mole of the hydrocarbon per mole of alkyl metal compound. However, because of the differences in equilibrium, it is usually advantageous to utilize an excess, e.g. 50 to 100% excess, of the polycyclic hydrocarbon in order to ensure the presence of a substantial amount of the complex in the premix. On the other hand, very large excesses, that is, more than 10 moles of cyclic hydrocarbon per mole of alkyl metal compound, should be avoided because they have an adverse effect on the polymerization reaction. Therefore, it is imperative to limit the excess of cyclic hydrocarbon to an amount which will produce a maximum amount of the desired equilibrium product, i.e. the complex, but small enough not to prevent polymerization.

After the complex has formed (this usually occurs within about 30 minutes, e.g. 1 to 5 minutes after the ingredients are mixed), the complex is preferably contacted with the reducible transition metal compound, e.g. 1 to 2 moles of crystalline titanium trichloride per mole of alkyl metal compound, and then introduced into the polymerization zone. Again, it is beneficial to allow the complex to remain in contact with the solid catalyst particles for at least a few minutes before transferring the mixture to the polymerization reactor. It has been found that highly satisfactory results are obtained by mixing the transition metal compound with the complex for from a few minutes to an hour before using the mixture to polymerize the olefin feed. The "aging period" can be carried out at any temperature which does not adversely affect the transition metal compound or the complex. Usually the materials are most conveniently mixed at about 0° to 100° C. and allowed to remain at that temperature for a short period of time. Satisfactory results are obtained by simply stirring the complex with the solid transition metal catalyst at approximately room temperature for 10 to 20 minutes. Alternatively, the polycyclic hydrocarbon may be added to the mixture of alkyl metal and transition metal compound, although this is generally less effective.

In the reactor, the catalyst-containing mixture is mixed with large quantities of hydrocarbon diluent and contacted with a $C_3$ and higher alpha olefin, such as butene-1, pentene-1 or 4-methylpentene-1. The polymerization is carried out in the conventional manner at temperatures ranging from about 0° to about 100° C., preferably about 50° to 85° C., under atmospheric or superatmospheric pressure, e.g. up to about 150 p.s.i.g.

The preferred cyclic hydrocarbons used to prepare the complex can be characterized as condensed ring compounds in which at least one ring is aromatic. The remaining rings may be aromatic or they may include one or more 5 membered carbon atom rings. The 5 membered carbon atom rings preferably contain 1 or 2 double bonds. Particularly effective are $C_9$ to $C_{12}$ aromatic bicyclic or tricyclic hydrocarbons having easily polarized unsaturation in the nonaromatic ring such as indene, or acenaphthylene, and those having a conjugated double bond in the nonaromatic carbon ring, such as azulene. In addition to the foregoing polycyclic compounds, aromatic substances, such as naphthylene, phenanthrene, anthracene, pyrene, and alkylaromatic compounds, such as 1 or 2-methyl naphthalene, 1,2-dimethylnaphthalene, 1,2,4-trimethylnaphthalene, alkylindenes substituted on the aromatic ring, acenaphthylene substituted on carbons 4, 5, 6 or 7, phenanthrene substituted on carbons 2, 3, 4, 5, 6 or 7, and similar compounds wherein the alkyl groups are not attached to the carbon atoms containing the polarizable unsaturation, since the steric effects of these groups would weaken the complexes with the catalyst components. Concentrates of aromatic refinery streams contain mixtures of these compounds which are effective and economical additives even when used in the form of their crude mixtures. Thus, the aromatic compound can contain from 2 to 4 or more carbon rings. Indene, which contains a benzene ring and a cyclo-olefinic group, is particularly useful because of its low melting point.

If desired $C_6$ to $C_8$ cyclic olefins and diolefins, such as cycloheptene, dicyclopentadiene and cyclooctadiene, can be used instead of aromatic compounds mentioned above. The most effective diolefins have a bridged carbon atom. While some of these compounds have been used as comonomers with ethylene this is not their function in the present invention.

The non-metal portion of alkyl metal compound may be all hydrocarbon or a part of it may be a halide, e.g. dialkyl aluminum chloride. Aluminum is the preferred metal because of its wide utility in the Ziegler-type catalyst. However, any of the other metal alkyls, such as diethyl magnesium or diethyl zinc, can also be used in the present invention. In other words, any of the Group II or III metals that have heretofore been used in the preparation of low pressure polyolefin catalysts can be utilized to prepare the complex. The alkyl groups attached to the metal can be either straight chain or branched and usually contain from 1 to 6 carbon atoms.

Nonlimiting examples of aluminum alkyls that are useful are triisobutyl aluminum, diethyl aluminum chloride, dipropyl aluminum chloride, triethyl aluminum, ethyl aluminum dichloride, diethyl aluminum iodide, diethyl aluminum bromide and trihexyl aluminum. Of the foregoing, the preferred alkyl aluminum compound is triethyl aluminum. The halide element in the alkyl metal compound may be fluorine, chlorine, bromine or iodine, and preferably has an atomic weight greater than 35.

Likewise, the transition metal halide catalyst can be any of those conventionally used in the Ziegler-type polymerization process. The preferred metal halide is a solid crystalline titanium trichloride. Other titanium catalysts, such as that obtained by cocrystallizing aluminum chloride with titanium trichloride ($TiCl_3 \cdot 0 \cdot 33AlCl_3$), may also be employed. In addition to titanium chloride, metal halides other than fluorides, e.g. titanium bromide and titanium iodide, can be employed in the present invention. Again the halogen is preferably one having an atomic weight greater than 35.

In addition to titanium halides, halides of other transition metals, such as the chlorides of zirconium, hafnium, thorium, uranium, vanadium, niobium, tantalum, chromium, molybdenum and tungsten can also be utilized. These metals are found in Groups IV–B, V–B, VI and VIII of the Periodic Chart of the Elements on pages 56 and 57 of Lange's Handbook of Chemistry, 8th edition.

As mentioned above, the polymerization may be effected in the presence of any suitable inert hydrocarbon diluent, e.g. $C_3$ to $C_8$ hydrocarbons, such as benzene, toluene, ortho, meta and/or paraxylene, normal hexane, propane, isooctane, isopentane, cyclohexane, etc. The preferred diluents are $C_5$ to $C_8$ aromatic hydrocarbons. Among the ethylenically unsaturated $C_3$ to $C_{10}$ hydrocarbon monomers that may be polymerized or block copolymerized with the modified catalyst are propylene, butene-1, pentene-1, 3-methylbutene-1, 3-methylpentene-1, 4-methylpentene-1, 4,4-dimethylpentene-1, 4-methylhexene-1, vinylcyclohexane, styrene, etc. The preferred monoolefin feed is propylene.

The polymerization may be carried out either batch-wise or continuously according to well known techniques. In the batch polymerization of monomers in accordance with the present invention, the feed is usually passed into the reactor until the diluent is saturated with the monomer or the desired concentration is reached, and about 0.1 to 0.5 wt. percent catalyst, used in the diluent, is added. Thereafter, the temperature is raised to the desired level, e.g. 75° to 85° C., over a 10 to 15 minute period and additional monomer is introduced into the reactor, for instance, bubbled through the liquid medium, until a suitable conversion is obtained or until the viscosity of the slurry becomes limiting. A typical batch run is about 0.5 to 4 hours at reaction temperature. Following the completion of the reaction, a suitable $C_1$ to $C_8$ alcohol, such as methanol or isopropanol, is added to the reaction mixture to destroy the catalyst and solubilize it. If desired, a suitable chelating agent, such as acetyl acetone, may be added with the alkanol to assist in the solubilization of the catalyst residue. Thereafter, the polymer slurry is recovered by filtration or other means from the reaction mixture. The polymer can be further purified by washing it with additional alcohol at a moderately high temperature, e.g. 50° to 120° C. The polymer can then be dried under vacuum and antioxidants and other stabilizing additives can be mixed with the polymer to prevent thermal and oxidative degradation. The entire reactor contents can be poured into a large excess of alkanol, such as isopropanol, to precipitate the portion of polymer product which is otherwise soluble in the reaction medium.

In a continuous process, the conversion rate is maintained at a level such that the reactor contains about 5 to 20 wt. percent polymer based on the total contents of the reactor. The catalyst slurry containing the complexed alkyl metal compound and the transition metal compound is usually added at a rate such that the catalyst concentration in the reaction medium is between about 0.05 and 1.0 wt. percent based on the weight of the diluent. A portion of the reaction mixture is continuously withdrawn from the reactor, the catalyst is deactivated by the addition of a small amount of an alkanol, and the solid polymer is separated from the rest of the slurry and recovered in the manner described above. The hydrocarbon diluent can be passed to a fractionating tower wherein it is separated from the other materials and, optionally, further purified by additional distillation and/or passing it through a bed of alumina or silica gel prior to recycling it to the polymerization reactor.

Among the advantages attending the use of the polymerization process described are the synthesis of a product having a greater crystallinity and higher tensile strength. In addition to improvements in the polymer properties, it has been found that less oily polymer is made. It is believed that some of the polycyclic hydrocarbons, particularly indene, will assist in the deashing of the polymer in that it will facilitate the washing of the deactivated catalyst from the polymer product. Further, some of the higher molecular weight polycyclic hydrocarbons can act as plasticizers and, in some cases, as antioxidants.

Besides the above-mentioned advantages, the polycyclic hydrocarbon compounds impart greater stability to the alkyl metal compound, especially the lower trialkyl aluminum compounds, and thereby reduce the danger connected with shipping and handling these pyrophoric substances.

The highly stereospecific polymers prepared in accordance with the present invention are useful for many purposes, such as the manufacture of textile fibers, films, dishware, etc. Polypropylene made by the present method usually has a tensile strength greater than 3,000 p.s.i., and sometimes as great as 4,000 p.s.i. or more, and therefore it is particularly suitable where strong or rigid polymers are desirable. The molecular weight of the polypropylene, as determined by the Kinsinger method (Kinsinger, Thesis, University of Pennsylvania, 1957), are between about 100,000, and 1,000,000 or more. For most applications, molecular weights of 200,000 to 600,000 are preferred.

The following examples are given in order to provide a better understanding of the invention.

EXAMPLES 1-6

In each of the following runs, the polycyclic hydrocarbon compound was dissolved in 90 ml. of a conventional xylene solvent at room temperature and triethyl aluminum was added with stirring. The mixture was stirred for about 5 minutes following the addition of the triethyl aluminum to permit the formation of the complex. Thereafter, crystalline alpha titanium trichloride was added and the resultant catalyst slurry was rinsed into a dropping funnel with 10 ml. of xylene, agitated in the funnel for about 15 minutes and then added to a stirred glass reactor containing 900 ml. of xylene saturated with propylene. The temperature of the reactor contents was raised to 85° C. over about a 15 minute period. Gaseous propylene was continuously bubbled through the xylene diluent at the rate of 100 to 200 ml. per minute greater than the absorption rate of the reaction mixture. The polymerization reaction which followed was terminated after 1 hour at 85° C. by adding 50 ml. of isopropanol and 5 ml. of acetyl acetone to the reaction mixture to destroy and solubilize the catalyst. The contents of the reactor was then poured into 2 l. of isopropanol to precipitate the soluble polymer and the polymer was filtered and washed with fresh, hot isopropanol. It was then washed with acetone containing inhibitors. The washed polymer was then vacuum dried at 75° C. for 8 hours and a snow-white granular powder was obtained which contained less than 50 p.p.m. of catalyst residue, generally less than 10 p.p.m. The tensile strength of each polymer was determined on a compression molded pad at a stress rate of 20 inches per minute using a standard method for polypropylene (ASTM D-412). The data are set forth in Table I.

*Table I.—Propylene polymerization*

| Examples | Control | 1 | 2 | 3 | 4 | 5 | 6 |
|---|---|---|---|---|---|---|---|
| Catalyst, Additive | None | Anthracene | Phenanthrene | Naphthalene | Azulene | Indene | Acenaphthylene |
| Amount of Additive, mmoles | 0 | 1 | 2 | 8 | 1 | 0.5 | 2 |
| Triethyl Aluminum, mmoles | 1 | 1 | 2 | 2 | 2 | 2 | 2 |
| TiCl$_3$, mmoles [1] | 2 | 2 | 4 | 4 | 2 | 4 | 4 |
| Rate, w./hr./w. (Al+Ti) | 180 | 175 | 185 | 177 | 57 | 54 | 143 | 134 |
| Polymer Properties: | | | | | | | |
| Intrinsic Viscosity | 2.70 | 2.70 | 3.16 | 3.02 | 4.77 | 4.71 | 3.18 | 4.45 |
| Kinsinger M.W.×10$^{-3}$ | 310 | 310 | 375 | 355 | 630 | 620 | 372 | 570 |
| Tensile, p.s.i. at 2″/min | 2,850 | 3,140 | 3,570 | 3,540 | 4,440 | 4,200 | 3,500 | 3,770 |

[1] α-TiCl$_3$, dry ball milled 6 days.

Data for a variety of additives are given in Table I together with a control run. All of the additives increased polymer crystallinity as measured by tensile strength. Azulene and acenaphthylene caused molecular weight to double. The effect of the strength of complexing is illustrated in Table I by comparing naphthalene and azulene with phenanthrene. Naphthalene required four times the concentration to be equivalent to phenanthrene whereas azulene was more effective at one-fourth the concentration. The superior results obtained with azulene and indene compared to naphthalene, or with acenaphthylene compared to phenanthrene and naphthylene, illustrate the desirability of having easily polarized unsaturation in five-membered rings.

EXAMPLE 7

A run was carried out in the same manner as Example 5 but using butene-1 instead of propylene. The polymer was more crystalline than the control product.

EXAMPLE 8

Another run was carried out in the same manner as Example 6 but using 4-methylpentene-1 instead of propylene. The monomer was added dropwise. Improved polymer properties were obtained compared with the control product.

EXAMPLE 9

A run similar to Example 4 was carried out using VCl$_3$ in place of TiCl$_3$ in the catalyst system. Again, improved polymer crystallinity was obtained with the additive.

EXAMPLE 10

A run was carried out in a rocking bomb containing 60 vol. percent propylene in xylene using 2 mmol diethyl zinc, 10 mmol acenaphthylene and 4 mmol TiCl$_3$ at 85° C., 2 hrs. The crystallinity of the polymer was higher than that of the control (no acenaphthylene).

EXAMPLE 11

A complex is prepared by mixing 4 mmoles of diethyl aluminum chloride with 4 mmoles of indene in 100 ml. of n-heptane.

EXAMPLE 12

A complex is prepared by mixing 2 mmoles of dibutyl magnesium with 2 mmoles of acenaphthylene and 100 ml. of xylene.

EXAMPLE 13

The polycyclic hydrocarbon additives of this invention are effective only in catalytic quantities. High concentrations complex so strongly with the catalyst components that they destroy catalyst activity by preventing the formation of active sites or by excluding monomer from the sites. Therefore, these polycyclic hydrocarbon compounds cannot be used in solvent quantities. When 50% or more of the xylene solvent is replaced by indene, acenaphthylene or anthracene, the polymerization of propylene is almost completely inhibited.

EXAMPLE 14

4-methyl-1-pentene is polymerized with a catalyst comprising 0.4 gram of TiCl$_3$·0.33AlCl$_3$, 0.448 gram of triethyl aluminum and 0.65 gram of dicyclopentadiene (DCP) in a mixed xylene solvent at 85° C. for 3 hours at about atmospheric pressure. The polymer product, which does not contain combined DCP, has a greater tensile strength and higher molecular weight than the control polymer made in the absence of DCP.

EXAMPLE 15

Example 5 is repeated using a premixed catalyst comprising 2 mmoles of DCP, 2 mmols of triethyl aluminum and 4 mmoles of TiCl$_3$.

As mentioned above, the invention is applicable only to the polymerization of homopolymers or block copolymers of C$_3$ and higher monoolefins; it is not useful in the polymerization of ethylene, diolefins or other monomers which do not depend upon isotacticity for their crystallinity. However, it is not intended to restrict the present invention to the above examples which are given merely to demonstrate some of the embodiments of the invention. It should only be limited by the appended claims in which it is maintained to claim all the novelty inherent in the invention, as well as all the modifications

What is claimed is:

1. A polymerization catalyst composition comprising the reaction product of an alkyl metal compound with a polycyclic aromatic hydrocarbon selected from indene of azulene; said reaction product being mixed with a transition metal halide, the mole ratio of the aromatic hydrocarbon to alkyl metal compound being in a mole ratio of between 0.5 and 10.

2. The composition of claim 1 wherein the aromatic hydrocarbon is indene.

3. The composition of claim 1 wherein the aromatic hydrocarbon is azulene.

4. The composition of claim 1 wherein the transition metal halide is crystalline titanium trichloride.

5. The composition of claim 2 wherein the transition metal halide is crystalline titanium trichloride.

6. The composition of claim 5 wherein the alkyl metal compound is aluminum triethyl.

7. A process for producing linear homopolymers or block copolymers of alpha olefins containing at least 3 carbon atoms which comprises contacting said olefins with the catalyst of claim 1.

8. The process of claim 7 wherein the olefin is propylene.

9. A process for producing polypropylene which comprises contacting propylene with the catalyst of claim 6.

References Cited by the Examiner

UNITED STATES PATENTS

| | | | |
|---|---|---|---|
| 2,906,763 | 9/1959 | McKinnis | 260—448 |
| 2,914,515 | 11/1959 | Stuart | 260—94.9 |
| 2,967,176 | 1/1961 | Pilar | 260—94.9 |
| 3,119,798 | 1/1964 | Moberly et al. | 260—93.7 |
| 3,122,527 | 2/1964 | Webb et al. | 260—94.9 |

JOSEPH L. SCHOFER, *Primary Examiner.*

M. B. KURTZMAN, *Assistant Examiner.*

UNITED STATES PATENT OFFICE
CERTIFICATE OF CORRECTION

Patent No. 3,278,511　　　　　　　　　　　　　　　October 11, 1966

Arthur W. Langer, Jr.

It is hereby certified that error appears in the above numbered patent requiring correction and that the said Letters Patent should read as corrected below.

Column 7, line 6, for "of" read -- or --.

Signed and sealed this 26th day of September 1967.

(SEAL)
Attest:

ERNEST W. SWIDER　　　　　　　　　　　　　　EDWARD J. BRENNER
Attesting Officer　　　　　　　　　　　　　　　Commissioner of Patents